United States Patent [19]

Brouwer

[11] Patent Number: 5,630,495
[45] Date of Patent: May 20, 1997

[54] CONVEYOR SYSTEM DIVERTER COMPONENTS HAVING FRICTION-ENHANCING SURFACES AND RELATED METHODS OF USE

[75] Inventor: Gerald A. Brouwer, Granville, Mich.

[73] Assignee: Rapistan Demag Corp., Grand Rapids, Mich.

[21] Appl. No.: 751,786

[22] Filed: Nov. 18, 1996

Related U.S. Application Data

[63] Continuation of Ser. No. 314,331, Sep. 28, 1994, abandoned.

[51] Int. Cl.$^6$ .................................................. B65G 47/10
[52] U.S. Cl. .................... 198/367; 198/369.4; 198/699.1; 492/37
[58] Field of Search ................................ 198/367, 369.4, 198/369.6, 688.1, 699.1, 780; 492/30, 37, 56

[56] References Cited

U.S. PATENT DOCUMENTS

| | | |
|---|---|---|
| 2,146,683 | 2/1939 | McColloh . |
| 2,342,159 | 2/1944 | Moran . |
| 2,976,738 | 3/1961 | Bascom . |
| 3,138,238 | 6/1964 | Good et al. . |
| 3,456,773 | 7/1969 | Titmas, Jr. . |
| 3,556,741 | 1/1971 | Bleecker . |
| 3,613,319 | 10/1971 | Takimura et al. . |
| 3,916,579 | 11/1975 | Waller et al. . |
| 3,983,988 | 10/1976 | Maxted et al. . |
| 4,372,435 | 2/1983 | Bradbury ...................... 198/369.4 |
| 4,598,815 | 7/1986 | Adama . |
| 4,724,950 | 2/1988 | Okamura . |
| 4,793,042 | 12/1988 | Easter . |
| 4,910,843 | 3/1990 | Lioy et al. . |
| 5,099,759 | 3/1992 | Sonobe et al. . |
| 5,117,961 | 6/1992 | Nicholson . |
| 5,161,306 | 11/1992 | Nakahira et al. . |
| 5,207,158 | 5/1993 | Fadner et al. . |
| 5,225,007 | 7/1993 | Hattori et al. . |
| 5,230,138 | 7/1993 | Shiga et al. . |
| 5,271,547 | 12/1993 | Carlson . |
| 5,305,522 | 4/1994 | Nawata et al. . |
| 5,320,042 | 6/1994 | Schwöpfinger . |
| 5,387,172 | 2/1995 | Habenicht et al. . |

FOREIGN PATENT DOCUMENTS

| | | |
|---|---|---|
| 0507755 | 10/1992 | European Pat. Off. . |
| 4226789A1 | 2/1974 | Germany . |
| 7325910 | 3/1974 | Germany . |
| 2849676A1 | 6/1979 | Germany . |
| 5747820 | 3/1982 | Japan . |
| 1447198 | 8/1976 | United Kingdom . |
| 2011028 | 7/1979 | United Kingdom . |
| 2025266 | 1/1980 | United Kingdom . |
| 2237257 | 5/1991 | United Kingdom . |

OTHER PUBLICATIONS

European Search Report in Application No. EP 95 30 5087.

*Primary Examiner*—Joseph E. Valenza
*Attorney, Agent, or Firm*—Van Dyke, Gardner, Linn & Burkhart, LLP

[57] ABSTRACT

A conveyor diverter system comprising one or more conveyors, components for diverter systems having friction-enhancing outer surfaces, friction-enhancing layers and compositions that provide such surfaces are disclosed. In addition, methods of reducing the frequency or occurrence of articles being misdiverted by use of such systems, components, layers and compositions are described. The preferred embodiment of the friction-enhancing layer and composition disposed on the outer periphery of the diverter components comprises grit materials dispersed in a metallic material such that a particular grit surface density is achieved and grit particles protrude above the uppermost surface of the metallic layer within a range of particular distances.

27 Claims, 3 Drawing Sheets

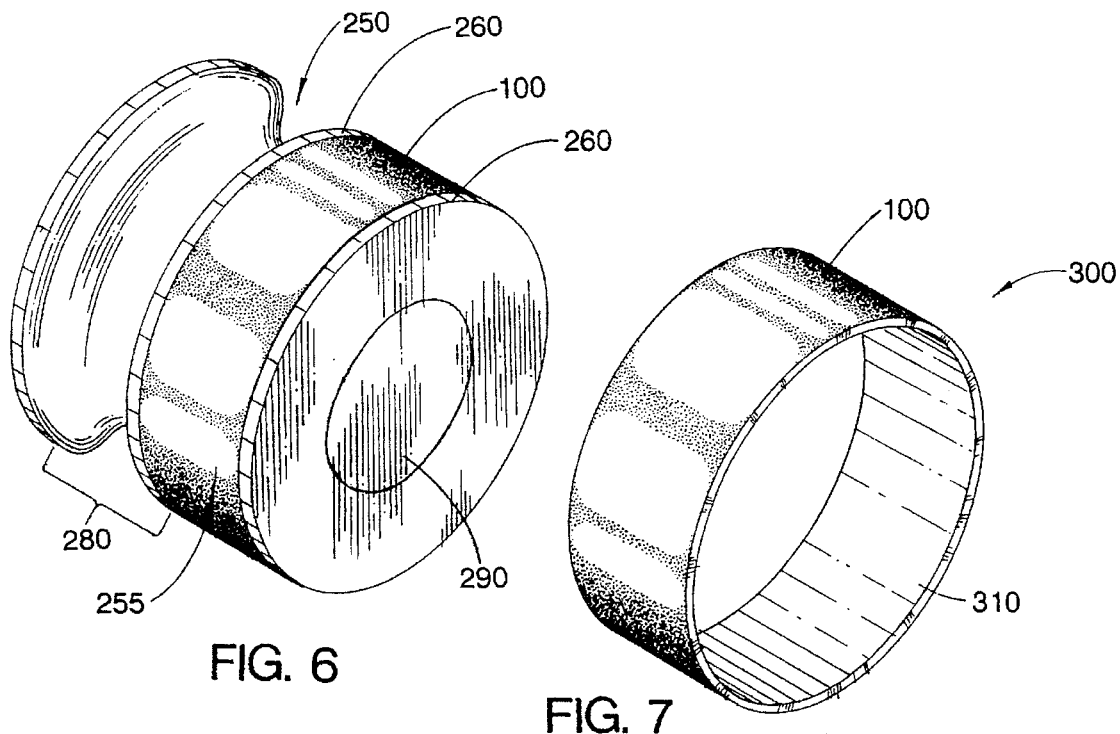
FIG. 6
FIG. 7
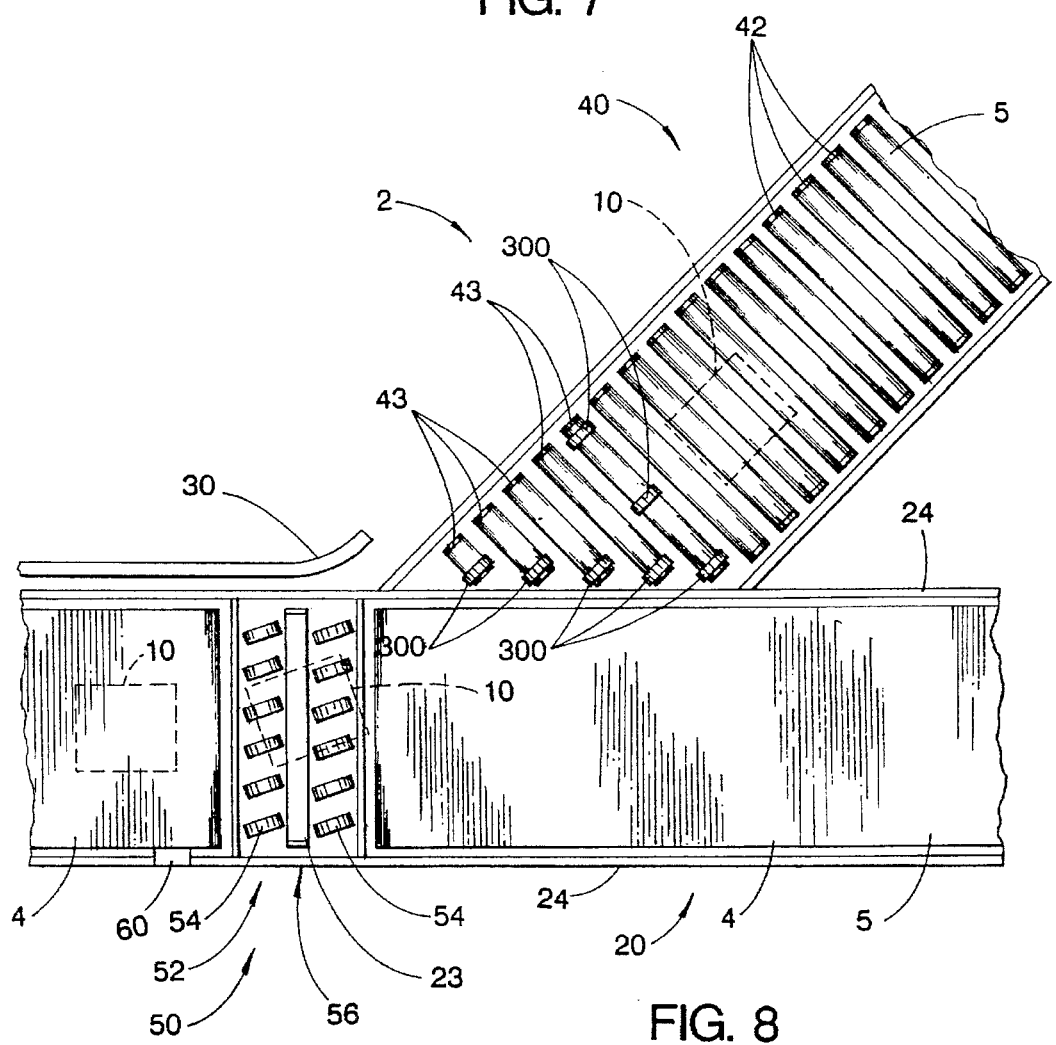
FIG. 8

CONVEYOR SYSTEM DIVERTER COMPONENTS HAVING FRICTION-ENHANCING SURFACES AND RELATED METHODS OF USE

This is a continuation of application Ser. No. 08/314,331 filed on Sep. 28, 1994, now abandoned.

BACKGROUND OF THE INVENTION

The present invention relates to components for conveyor diverter systems having friction-enhancing surfaces for improving the diverting of articles being diverted by the diverter system. The term "diverter system" as used herein is a subsystem of a conveyor system utilizing one or more diverter components for laterally displacing articles being conveyored in order to transfer articles to branch lines or otherwise altering the course of articles.

A variety of diverter systems are known in the art. However, all suffer from various problems. Many diverter components employed in such systems utilize a friction outer surface for contacting the articles being diverted. Such friction surface enables the diverting of moving articles by diverter components. Currently known diverter components have outer surfaces that achieve only moderate levels of friction between the diverter component and the article being diverted. These known diverter components are only able to achieve limited diverting action because slippage often occurs between the diverter component and article. Thus, there is a need for a diverter component that has a relatively high friction outer surface such that slippage between the diverter component and article is eliminated or significantly reduced.

Another problem associated with currently known diverter systems is that the friction surfaces of the diverter components collect wax and other contaminants, typically from the articles, e.g. cardboard cartons, being diverted or conveyored. Contaminant build-up on friction surfaces of diverter components decreases the effective level of friction achieved between diverter component and article being diverted and so further increases the tendency for slippage to occur. In addition, contaminant build-up requires frequent maintenance to clean the friction surfaces and remove the wax or other contaminants that have accumulated on those surfaces. Therefore, there is a need for a diverter component that does not accumulate such build-up or else accumulates such build-up at a significantly lower rate than currently known diverter components, and thus does not require the frequent maintenance involved in cleaning the outer periphery of the diverter component.

It is usually desirable to use relatively high conveying speeds for transferring conveyored articles from one location to another. Such high speeds result in greater kinetic energy of the moving articles. Since the kinetic energy of moving articles increases with the square of the velocity, relatively minor increases in conveyor speeds can result in significant increases in the kinetic energy of the moving articles. The high speeds make it more difficult to effectively divert and change course of the moving articles. Thus, there is a need for a diverter component capable of effectively diverting articles moving at relatively high speeds.

Currently known diverter systems suffer from a relatively high frequency or occurrence of nondiverted articles. Nondiverted articles must be collected and re-introduced onto the sortation conveyor. In applications involving counting, monitoring or other data collection associated with conveyored articles, nondiverted articles must also be re-entered into the system and any errors associated with the nondiversion accounted for. Re-entering nondiverted articles in such systems is tedious and time-consuming. Thus, there is a need for an apparatus and related method of use for eliminating or significantly reducing the frequency or occurrence of nondiverted articles when utilizing diverter systems.

SUMMARY OF THE INVENTION

The present invention relates to conveyor diverter systems, components for diverter systems having friction-enhancing outer surfaces, and friction-enhancing layers and compositions that provide such surfaces. The friction-enhancing layers of the present invention include an effective amount of a grit material that is dispersed in a metallic material disposed on the outer periphery of the diverter component. The conveyor diverter systems of the present invention comprise a conveyor that includes a conveying surface supported by a framework structure, a divert apparatus that includes at least one diverter component, such that the diverter component includes a friction-enhancing layer disposed on an outer surface of the component, wherein the layer includes an effective amount of grit material dispersed in a metallic material contacting the outer surface of the diverter component. In addition, the present invention relates to methods for reducing the frequency or occurrence of nondiverted articles by use of such systems and components.

BRIEF DESCRIPTION OF THE DRAWINGS

FIG. 6 illustrates a second preferred embodiment diverter component;

FIG. 7 illustrates a third preferred embodiment diverter component; and

FIG. 8 illustrates an alternative embodiment conveyor diverter system.

DETAILED DESCRIPTION OF THE PREFERRED EMBODIMENTS

Figure 1:
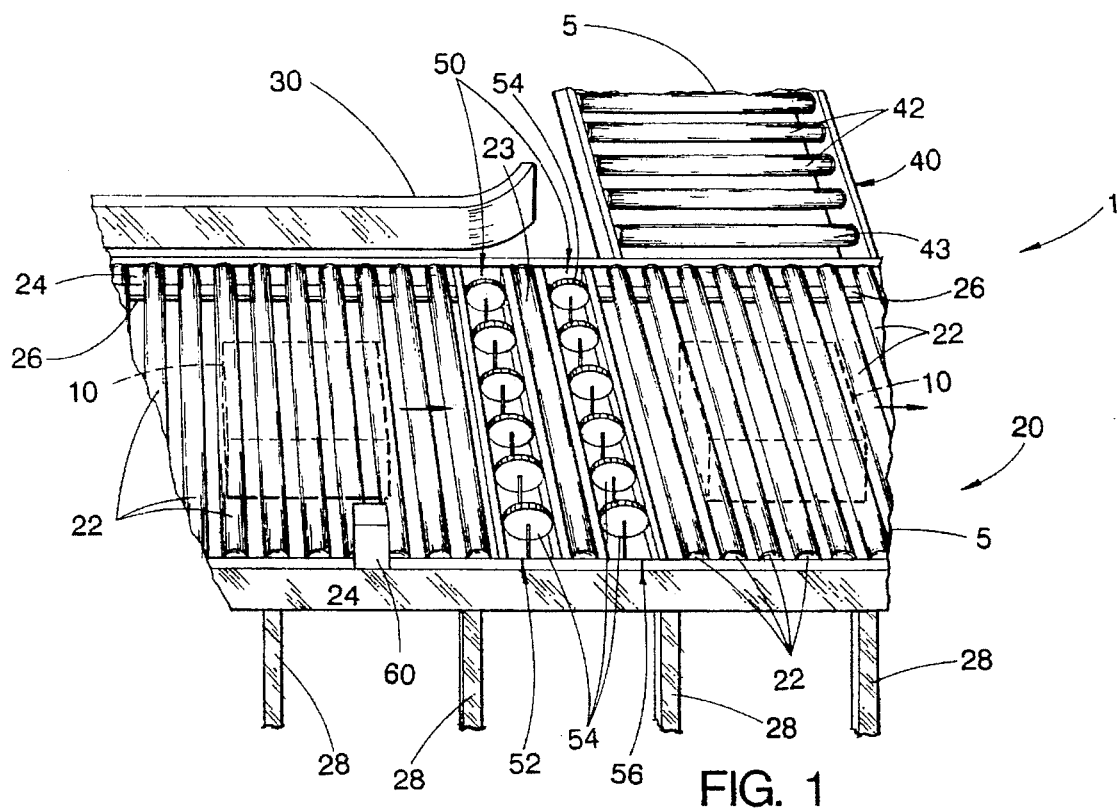
FIG. 1 illustrates a conveyor diverter system useful with the invention in a nonactuated, nondivert position.

The preferred embodiment conveyor diverter system is any conveyor diverter system that utilizes diverter components having friction-enhancing outer surfaces such as those described in greater detail herein. Examples of typical diverter systems that are suitable for use with the preferred diverter components described herein and which may incorporate the preferred diverter components include, but are not limited to, those described in U.S. Pat. Nos. 3,138,238; 3,983,988; and 4,598,815 all of which are hereby incorporated herein by reference. FIG. 1 illustrates a preferred conveyor diverter system 1 including a diverter system for laterally diverting one or more articles 10 on conveying surface 5 of conveyor 20. Conveyor 20 includes a conveying surface 5 preferably as a plurality of powered rollers 22 spaced and supported between channels 24 and driven by a drive belt 26. The channels 24 are supported by a conventional framework structure 28 that supports diverter system 1 above the floor. An intersecting conveyer 40 may intersect main conveyor 20 typically at an angle of about 15° to about 90° and preferably at an angle of about 30° to about 45°, and includes conveying surface 5, also preferably in the form of a plurality of similarly powered rollers 42, and at least one powered junction roller 43, described in greater detail herein, disposed near, preferably adjacent to, the point of intersection of main conveyor 20 and intersecting conveyor 40.

Positioned at a divert location along main conveyor 20, slightly upstream the intersection of main conveyor 20 and intersecting conveyor 40, is a divert apparatus 50 illustrated in its nonactuated, nondivert position in FIG. 1. A conventional bumper guard 30 is positioned along the edge of conveyor 20 upstream and adjacent divert apparatus 50. Divert apparatus 50 is selectively actuated, preferably via a reflective sensor and electronic controls 60 known in the art and positioned on the edge of conveyor 20, as illustrated in FIG. 1. Divert apparatus 50 may be actuated by other means including, but not limited to, proximity sensors, weight sensors, other sensing means that produce a control signal to indicate the presence of article 10. Divert apparatus 50 may also be manually actuated by an operator.

Divert apparatus 50 comprises a first row 52 (depicted in FIG. 1 in a nondivert position) of spaced powered diverter rollers 54 and a second downstream row 56 (depicted in FIG. 1 in a nondivert position) of spaced powered diverter rollers 54. Preferably, first row 52 of the plurality of powered diverter rollers and second row 56 of the plurality of powered diverter rollers are each mounted on a pivoting horizontal axis. An intermediate roller 23 is positioned between rows 52 and 56, and is part of conveyor 20. In the nondivert position shown in FIG. 1, diverter rollers 54 are aligned along the longitudinal axis of conveyor 20 such that as article 10 passes thereover, the article continues along conveyor 20.

Figure 2:
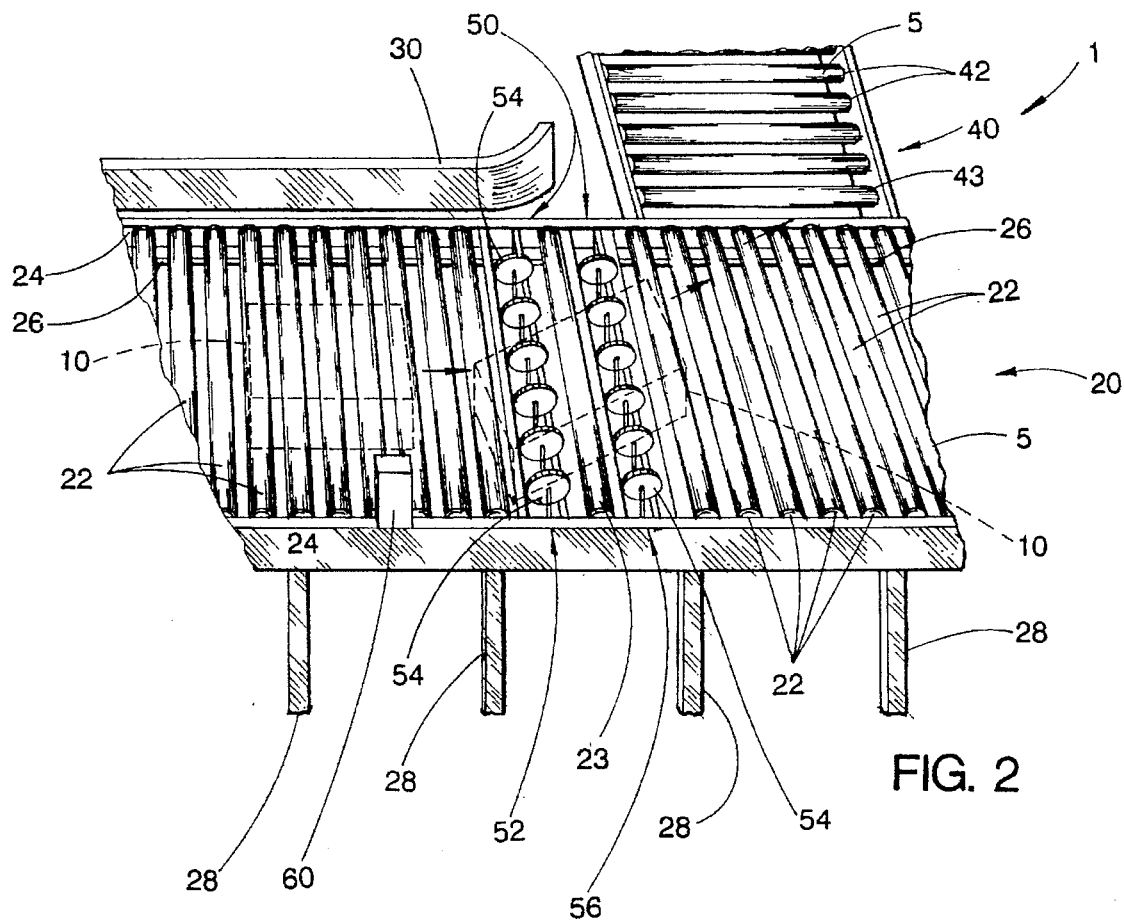
FIG. 2 illustrates the conveyor diverter system depicted in FIG. 1 in a divert position.

FIG. 2 illustrates divert apparatus 50 in a divert position with first row 52 in divert position, and second row 56 in divert position. When divert apparatus 50 is actuated, powered diverter rollers 54 are raised and rotated, preferably via the pivoting horizontal axes, to progressively raise article 10 from conveyor 20, rotate it, and accelerate it onto conveyor 40. This type of divert apparatus is referred to herein as a first type of diverter.

FIG. 8 illustrates an alternative preferred embodiment conveyor diverter system 2, similar to system 1 previously described. System 2 utilizes one or more conveyor belts 4 for conveying surface 5. In addition, conveyor 40 may intersect conveyor 20 at an angle less than 90°, such as about 45°, as depicted in FIG. 8. Where conveyor 20 utilizes a single conveyor belt 4, the belt extends below and runs underneath divert apparatus 50. In instances where a plurality of belts are employed, the belts on the upstream and downstream sides of divert apparatus 50 are positioned adjacent and proximate to divert apparatus 50 such that articles are smoothly transferred over apparatus 50. In system 2, conveyor 40 is depicted as including a plurality of rollers 42 and 43. It is clearly within the scope of the preferred embodiments of the present invention that conveyor 40 utilize one or more belt conveyors for conveying surface 5.

Although conveyor diverter systems 1 and 2 have been described and illustrated as comprising a first conveyor 20 and a second intersecting conveyor 40, the preferred embodiment conveyor diverter system also encompasses a single conveyor, similar to conveyor 20, comprising a divert apparatus disposed along the conveyor such that diverted articles can be diverted or projected off the conveyor to a desired location alongside the conveyor, onto a slide, or parallel conveyor.

Figure 3:
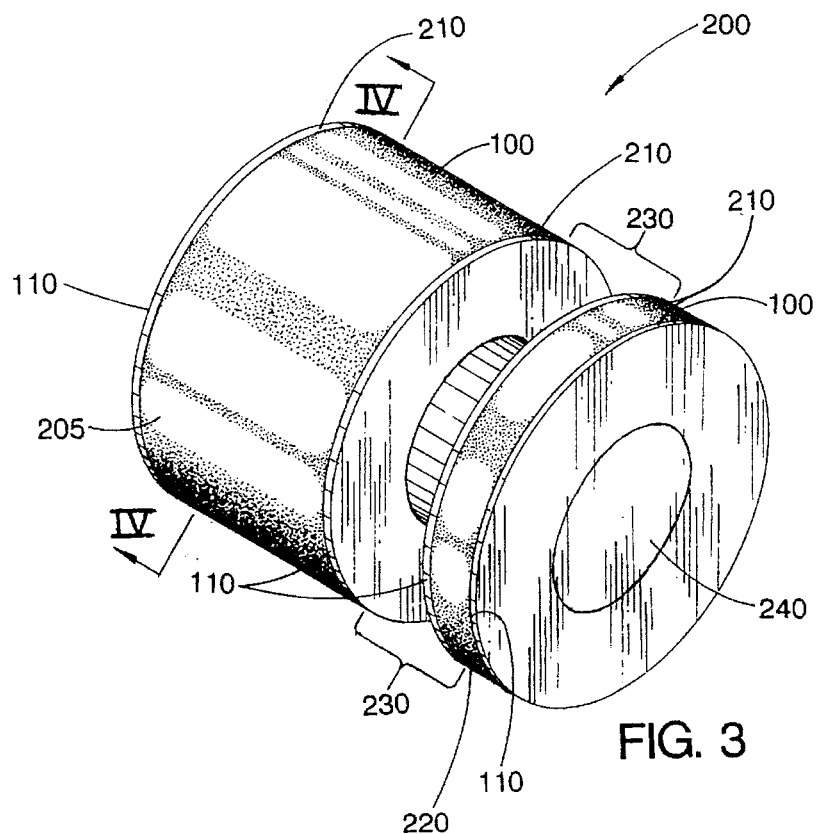
FIG. 3 illustrates a first preferred embodiment diverter component.

FIG. 3 illustrates a first preferred embodiment diverter component 200 having a friction-enhancing layer 100 disposed on its outer periphery 110. Component 200 is representative of a diverter component primarily for use in a second type of divert apparatus. Such apparatus is distinguishable from the previously noted first type divert apparatus, such as divert apparatus 50 illustrated in FIGS. 1 and 2, wherein the diverter components are simultaneously lifted and rotated thereby inducing the article contacting the diverter components to also rotate. In the second type divert apparatus described herein, one end of the diverter component is raised to cause the article to alter its course of travel. Depending upon the raise angle or incline of the diverter component and rotational speed of the diverter component, the article can be diverted from its former path of travel.

Component 200 has a first circumferential region 205 within which friction-enhancing layer 100 extends preferably around the entire perimeter of component 200, bordered between regions 210 that do not contain layer 100. Similarly, component 200 has a second circumferential region 220 within which layer 100 extends preferably around the entire perimeter of component 200 and bordered between regions 210. Disposed between regions 205 and 220 is circumferential seat 230 for a drive belt, drive chain, or other powering means to reside in and engage and rotate component 200. Mounting recess 240 is provided on one or both ends of component 200 for mounting or engaging to a shaft enabling component 200 to rotate.

Diverter component 200, primarily for use in the second type divert apparatus, may be utilized for one-way or two-way diverting. One-way diverting diverts conveyored articles only in one direction, e.g. left or right, depending upon which end of the diverter component is configured to raise. Two-way diverting enables articles to be diverted to either side depending upon the action of the divert apparatus. That is, unlike one-way diverting, in two-way diverting, either end of the diverter component may be selectively raised. In two-way diverting, either end of the diverter component may be raised depending upon the direction desired for diverting, and so, both ends of the diverter component are covered with friction-enhancing layer 100. Component 200 illustrated in FIG. 3 exemplifies a diverter component for use in a two-way divert apparatus as both regions 205 and 220 contain friction-enhancing layer 100. In applications where only one-way diverting is required, it is only necessary to provide friction-enhancing layer 100 on the end of roller 200 that is raised, that is the end near region 205 or the end near region 220. Various modifications of diverter component 200 are envisioned such as rings or sleeves which are pressed onto a roller thereby providing a more economical construction.

Figure 4:
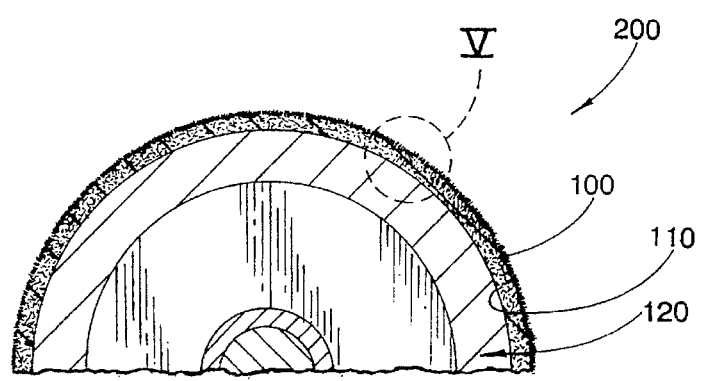
FIG. 4 is a cross section of the first preferred embodiment diverter component having a friction-enhancing layer disposed on the outer periphery of the component.
Figure 5:
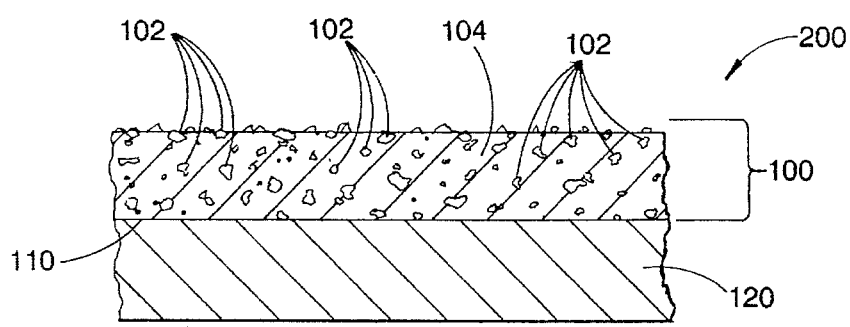
FIG. 5 is a magnified view of the cross section illustrated in FIG. 4, detailing the friction-enhancing layer of the preferred embodiment.

FIG. 4 illustrates a cross section of the first preferred embodiment diverter component 200 having friction-enhancing layer 100 disposed on outer periphery 110 of diverter component substrate 120. It is preferred, although not necessary, that layer 100 be disposed uniformly about the entire circumferential periphery of substrate 120. Variations are envisioned in which layer 100 is disposed only on a portion of periphery 110. FIG. 5 is a magnified view of the cross section illustrated in FIG. 4, detailing friction-enhancing layer 100. Layer 100 is adhered to the outer periphery 110 of substrate 120 of diverter component 200.

As further illustrated in FIG. 5, layer 100 is formed from a friction-enhancing composition comprising an effective amount of grit material 102 dispersed in a layer of metallic material 104. Metallic material 104 comprises one or more metals or alloys that may be adhered or otherwise bonded to outer periphery 110. The preferred type of material for metallic material 104 is a metallic braze material. A wide array of metallic braze materials may be utilized such as, but not limited to, copper-based materials, silver-based materials, nickel-based materials, aluminum-based materials, tin-based materials, lead-based materials, and combinations or alloys of any of these. The most preferred type of material is a copper-based braze material. The composition of the preferred copper-based braze material will vary depending upon the end use requirements for layer 100, however a typical composition comprises 30–90% of a primary copper-based alloy including cuprous oxide and copper. The copper-based braze material may also further comprise a secondary alloy such as a nickel-based alloy.

The grit material 102 is any hard abrasive material known in the art such as diamond, corundum, emery, garnet, pumice, pumicite, tripoli, silicon carbide, aluminum oxide, zirconia alumina, synthetic diamond, boron nitride, tungsten carbide, steel wool, metal oxides, and combinations thereof. The preferred material for grit material 102 is tungsten carbide. Grit material 102 is in the form of particles, preferably ranging in size from about number 16 to about number 60, and most preferably from about number 16 to about number 24, according to the Abrasive Grain Sizes and United States Standard Sieve Series, adopted by the Abrasive Grain Association.

The particles of grit material 102 are preferably uniformly dispersed throughout metallic material 104. The thickness of metallic material layer 104 preferably ranges from about 0.01 inches to about 0.05 inches. It is envisioned that greater or lesser thicknesses could be utilized depending upon the application requirements of layer 100. The grit material is utilized in an "effective amount" in the composition, such that friction-enhancing layer 100 formed from the composition has a grit surface density of about 30%. "Grit surface density" is defined herein as the proportion of surface area that is grit material 102 appearing above the surface of metallic material 104.

The present inventor has discovered that the objectives of the present invention are achieved by friction-enhancing layer 100 having about a 30% grit surface density and having at least a portion of the particles of exposed grit material 102 protrude or extend above the outermost surface of metallic material 104, a distance of from about 0.02 inches to about 0.07 inches and most preferably from about 0.04 inches to about 0.05 inches. If grit surface densities significantly less than about 30% are utilized, the resulting friction-enhancing layer 100 generally has insufficient friction. If grit surface densities greater than about 30% are utilized, although the resulting friction levels may be sufficient, the distances between protruding grit particles are relatively close such that wax or other contaminants readily collect in those regions. Similarly, the distance that the particles of grit material protrude above the surface of the metallic material is important, as distances less than about 0.02 inches are generally insufficient to achieve the necessary friction level, and distances greater than about 0.07 inches typically result in excessive wear of the articles being diverted. Thus, exposed portions of grit material particles protruding above the metallic layer a distance of between about 0.04 inches and about 0.05 inches, and a grit surface density of about 30% provides the optimum balance between the trade-offs of achieving a relatively high level of friction, not causing excessive wear of articles being diverted, and reducing the tendency for wax or other contaminant build-up.

FIG. 6 illustrates a second preferred diverter component 250 having friction-enhancing layer 100 disposed on its outer periphery. Diverter component 250 is representative of the type of diverter component utilized in the first type divert apparatus, such as illustrated in FIGS. 1 and 2 and generally corresponds to diverter rollers 54 depicted therein. Diverter component 250 is a preferred version of the powered diverter rollers 54 in FIGS. 1 and 2. Component 250 has a circumferential region 255 within which friction-enhancing layer 100 extends preferably around the entire perimeter of component 250 bordered between regions 260 that do not have layer 100 disposed therein. Component 250 also provides a circumferential seat 280 for a drive belt, chain, or other powering means to reside in and engage component 250. Mounting recess 290 is provided on one or both ends of component 250 for mounting or engaging to a shaft enabling component 250 to rotate. The magnified cross section of layer 100 disposed on component 250 would appear as indicated in FIG. 5 for component 200.

FIG. 7 illustrates third preferred embodiment diverter component 300 in the form of a ring having friction-enhancing layer 100 disposed on its outer periphery and an interior mounting surface 310. The magnified cross section of layer 100 disposed on component 300 would appear as indicated in FIG. 5 for component 200. This embodiment is a ring that can be slipped over a powered junction roller of an intersecting conveyor to improve the friction level achieved by the junction roller and thereby greatly enhance the diverting process. FIGS. 1 and 2 illustrate a powered junction roller 43 of intersecting conveyor 40. A powered junction roller having one or more ring components 300 secured to its outer periphery "pulls" diverted articles from a main conveyor, such as conveyor 20 of FIGS. 1 and 2, onto an intersecting conveyor, such as conveyor 40. Once one or more ring components 300 are positioned on a junction roller, they can be affixed to the roller by tack welding or other ways known in the art, such as but not limited to, utilizing adhesive means between mounting surface 310 and the junction roller, and various pressing operations. One or more ring components 300 may also be used in conjunction with powered rollers in a conveyor or diverter system other than a junction roller. For instance, one or more ring components could be attached to any of rollers 42 or 43 in the system illustrated in FIGS. 1 and 2. Moreover, there may be provided several junction rollers, instead of a single junction roller, all of which can employ one or more ring components 300, such as is illustrated in FIG. 8 in which conveyor 40 comprises a plurality of junction rollers 43, having one or more ring components 300.

All the previously described preferred embodiment diverter components, when incorporated in their appropriate diverter systems, achieve significantly higher levels of friction between the diverter component and article being diverted. Moreover, none of the previously described preferred embodiment diverter components accumulate build-up of wax and other contaminants, or else accumulate such build-up at a significantly lower rate than currently known diverter components, and thus do not require frequent maintenance involved in cleaning the outer periphery of the diverter component. In addition, all the previously described preferred embodiment diverter components provide improved diverting action of articles moving at relatively high speeds.

The friction-enhancing layer 100 is deposited or formed on the surface of the diverter component by applying the previously described composition, comprising grit material 102 dispersed in metallic material 104, to the outer surface of the diverter component followed by heating to a temperature sufficient to melt the metallic material and bond it to the surface of the diverter component. It is also possible to first apply metallic material 104 to the outer surface of the diverter component and then apply grit material 102 in an effective amount such that a 30% grit surface density is obtained. The heating step is then performed. When utilizing a copper-based braze material for metallic material 104, heating should be performed to a temperature of about 2,000° F. U.S. Pat. 5,271,547 to Carlson describes a method for brazing tungsten carbide particles to a metallic substrate for forming abrasive tools, and is hereby incorporated herein by reference.

The present invention also provides methods for reducing the frequency or occurrence of nondiverted articles by use of the diverter components described herein. In typical conveyor diverter systems utilizing conventional diverter components, there is a high occurrence of nondiverted articles. This is undesirable since nondiverted articles must be collected and placed onto the conveyor, and depending upon the application, re-entered into the system. In accordance with a preferred method of reducing the frequency of nondiverted articles when utilizing a conveyor diverter system, one or more, preferably a majority, and most preferably all, the diverter components in the conveyor diverter system are coated in appropriate regions, with the friction-enhancing composition described herein. It is preferred to apply the friction-enhancing composition to the regions of the diverter component that will contact articles being diverted. Such regions, for instance are, for components similar to component 200 described herein, regions 205 and 220; and for components similar to component 250 described herein, region 255. After application or coating of the friction-enhancing composition to the outer surface of the diverter component, the coated component is then sufficiently heated to form layer 100. Instead of depositing a layer of friction-enhancing composition on one or more diverter components, the uncoated diverter components in the system could be substituted with suitable replacement diverter components already having friction-enhancing layers disposed on their outer periphery.

Although the present invention has been primarily described in conjunction with powered diverter components, the present invention also encompasses nonpowered diverter systems that employ "gravity rollers". These systems rely, at least in part, upon the inertia of the moving article(s) to provide the article with velocity after being diverted. Accordingly, gravity rollers are typically nonpowered, or in some instances, may be minimally powered.

Of course, it is understood that the foregoing are merely preferred embodiments of the invention and that various changes and alterations can be made without departing from the spirit and broader aspects thereof as set forth in the appended claims, which are to be interpreted in accordance with the principals of patent law including the Doctrine of Equivalents.

The embodiments of the invention in which an exclusive property or privilege is claimed are defined as follows:

1. A conveyor diverter system utilizing at least one diverter component having a friction-enhancing outer article contacting surface, said system comprising:
   a conveyor including a conveying surface supported by a framework structure;
   a divert apparatus including at least one diverter component, said divert apparatus disposed along said conveyor; and
   wherein said at least one diverter component includes a friction-enhancing layer disposed on an outer article contacting surface of said component, said friction-enhancing layer including an effective mount of grit material dispersed in a metallic material cornering said outer article contacting surface of said diverter component.

2. The diverter system of claim 1 wherein said friction-enhancing layer has a grit surface density of approximately 30%.

3. The diverter system of claim 1 wherein said grit material comprises abrasive particles having a size of from about number 16 to about number 60.

4. The diverter system of claim 3 wherein said grit material comprises abrasive particles having a size of from about number 16 to about number 24.

5. The diverter system of claim 1 wherein said grit material is uniformly dispersed in said metallic material.

6. The diverter system of claim 1 wherein said grit material is in the form of particles, at least a portion of which protrude above the outermost surface of said metallic layer a distance of from about 0.02 inches to about 0.07 inches.

7. The diverter system of claim 6 wherein said grit material is in the form of particles, at least a portion of which protrude above the outermost surface of said metallic layer a distance of from about 0.04 inches to about 0.05 inches.

8. The diverter system of claim 1 wherein said grit material is selected from the group consisting of diamond, corundum, emery, garnet, pumice, pumicite, tripoli, silicon carbide, aluminum oxide, zirconia alumina, synthetic diamond, boron nitride, tungsten carbide, steel wool, metal oxides, and combinations thereof.

9. The diverter system of claim 8 wherein said grit material is tungsten carbide.

10. The diverter system of claim 1 wherein said metallic material is selected from the group consisting of copper-based materials, silver-based materials, nickel-based materials, aluminum-based materials, tin-based materials, lead-based materials, and combinations or alloys thereof.

11. The diverter system of claim 1 wherein said metallic layer comprises a copper-based braze material.

12. The diverter system of claim 1 wherein said divert apparatus further includes a plurality of said diverter components individually mounted on a pivoting horizontal axis.

13. The diverter system of claim 1 further comprising:
   a second conveyor intersecting said conveyor at a point of intersection downstream of said divert apparatus, said second conveyor including a second conveying surface supported by a framework structure.

14. The diverter system of claim 13 further comprising:
   at least one powered junction roller included in said second conveyor, disposed near said point of intersection; and
   at least one friction-enhancing ring disposed over said junction roller, said ring comprising said friction-enhancing layer disposed on its outer surface.

15. A diverter component for use in a diverter system, said component having an outer article contacting surface for cornering diverted articles and comprising:
   a generally cylindrical substrate having a circumferential outer article contacting surface between a first and a second end; and
   a friction-enhancing layer disposed on said outer article contacting surface, said friction-enhancing layer comprising an effective mount of grit material dispersed in a metallic material disposed on said outer article contacting surface of said diverter component.

16. The diverter component of claim 15 wherein said friction-enhancing layer has a grit surface density of about 30%.

17. The diverter component of claim 15 wherein said grit material comprises particles having a size of from about number 16 to about number 24.

18. The diverter component of claim 15 wherein said grit material is selected from the group consisting of diamond, corundum, emery, garnet, pumice, pumicite, tripoli, silicon carbide, aluminum oxide, zirconia alumina, synthetic diamond, boron nitride, tungsten carbide, steel wool, metal oxides, and combinations thereof.

19. The diverter component of claim 15 wherein said grit material comprises particles of tungsten carbide.

20. The diverter component of claim 15 wherein said grit material is in the form of particles, at least a portion of which protrude above the outermost surface of said metallic layer a distance of from about 0.04 inches to about 0.05 inches.

21. The diverter component of claim 15 wherein said metallic material is selected from the group consisting of copper-based materials, silver-based materials, nickel-based materials, aluminum-based materials, tin-based materials, lead-based materials, and combinations or alloys thereof.

22. The diverter component of claim 15 wherein said metallic material comprises a copper-based braze material.

23. The diverter component of claim 15 wherein said component further comprises:

a first circumferential region proximate to said first end, said first region containing said friction-enhancing layer;

a second circumferential region proximate to said second end, said second region containing said friction-enhancing layer; and a circumferential seat disposed between said first region and said second region.

24. The diverter component of claim 15 wherein said component further comprises:

a first circumferential region proximate to one of said first end and said second end, said first region containing said friction-enhancing layer; and a circumferential seat disposed adjacent said first region.

25. The diverter component of claim 15 wherein said component is in the form of a ring.

26. A method of reducing the frequency of nondiverted articles when utilizing a diverter system comprising a conveyor including a first plurality of powered rollers disposed with a framework structure, a divert apparatus comprising at least one conventional diverter component, said divert apparatus disposed along said first conveyor, said method comprising:

replacing said at least one conventional diverter component with a diverter component comprising a friction-enhancing layer disposed on its outer article contacting surface, said friction-enhancing layer comprising an effective mount of grit material dispersed in a metallic material disposed on said outer article contacting surface of said diverter component.

27. A method of reducing the occurrence of nondiverted articles when utilizing a diverter system comprising a conveyor including a first plurality of powered rollers disposed with a framework structure, a divert apparatus comprising at least one diverter component having an outer article contacting surface, said divert apparatus disposed along said conveyor, said method comprising:

applying a friction-enhancing composition to said outer article contacting surface of said at least one diverter component, said composition comprising an effective amount of grit material dispersed in a metallic material; and heating said composition to form a friction-enhancing layer disposed on said outer article contacting surface of said diverter component.

* * * * *

UNITED STATES PATENT AND TRADEMARK OFFICE
CERTIFICATE OF CORRECTION

PATENT NO.    : 5,630,495
DATED         : May 20, 1997
INVENTOR(S)   : Gerald A. Brouwer It is certified that error appears in the above-identified patent and that said Letters Patent is hereby corrected as shown below:

Title page,
Item [75], Inventor, "Granville" should be -- Grandville --

Column 1,
Line 14, "heroin" should be -- herein --
Line 30, "them" should be -- there --

Column 8,
Line 7, "mount" should be -- amount --
Lines 8 and 62, "cornering" should be -- contacting --

Column 9,
Line 1, "mount" should be -- amount --

Signed and Sealed this

Eighteenth Day of February, 2003

JAMES E. ROGAN
*Director of the United States Patent and Trademark Office*